(12) United States Patent
Oliynyk et al.

(10) Patent No.: US 8,204,958 B2
(45) Date of Patent: Jun. 19, 2012

(54) APPARATUS AND METHODS FOR NETWORK ANALYSIS

(75) Inventors: Roman T. Oliynyk, Minnetonka, MN (US); Dwight Benson, Eden Prairie, MN (US); Douglas M. Smith, Mound, MN (US)

(73) Assignee: Network Instruments, LLC, Minnetonka, MN (US)

( * ) Notice: Subject to any disclaimer, the term of this patent is extended or adjusted under 35 U.S.C. 154(b) by 486 days.

(21) Appl. No.: 12/352,365

(22) Filed: Jan. 12, 2009

(65) Prior Publication Data

US 2010/0180004 A1 Jul. 15, 2010

(51) Int. Cl.
*G06F 15/16* (2006.01)

(52) U.S. Cl. ......... 709/217; 709/27; 709/233; 709/224; 370/252; 370/463; 370/469; 370/516; 370/329

(58) Field of Classification Search .................. 709/217
See application file for complete search history.

(56) References Cited

U.S. PATENT DOCUMENTS

| | | | | |
|---|---|---|---|---|
| 4,901,277 A | * | 2/1990 | Soloway et al. | 709/233 |
| 7,133,943 B2 | * | 11/2006 | Carnevale et al. | 710/52 |
| 7,508,764 B2 | * | 3/2009 | Back et al. | 370/235 |
| 7,668,111 B2 | * | 2/2010 | Chandrasekaran et al. | 370/252 |
| 2005/0160308 A1 | * | 7/2005 | Elcock et al. | 714/5 |
| 2007/0058632 A1 | * | 3/2007 | Back et al. | 370/392 |
| 2007/0160073 A1 | * | 7/2007 | Toumura et al. | 370/419 |

OTHER PUBLICATIONS

MaaTec, "MaaTec Network Analyzer 1.6", Sep. 2003, all pages.*
Szydlowski, "PCI Express vs. PCI: Application and implementation scenarios", Oct. 2004, all pages.*
Wayback machine, history of website "MaaTec Network Analyzer 1.6", Sep. 2003, all pages.*

* cited by examiner

*Primary Examiner* — Hua Fan
(74) *Attorney, Agent, or Firm* — Schwegman, Lundberg & Woessner, P.A.

(57) ABSTRACT

Embodiments of methods, systems and apparatus for analysis and capture of network data items are described herein. Some embodiments include a receiving module which may receive a network data item from a network and which may then duplicate the network data item into two network data items. A capture module may receive one of the network data items for storage in storage device. A statistics or analysis module may in parallel receive the other network data item and may then perform network analysis on that network data item. Other embodiments are described and claimed.

13 Claims, 9 Drawing Sheets

_US 8,204,958 B2_

APPARATUS AND METHODS FOR NETWORK ANALYSIS

TECHNICAL FIELD

This application relates to apparatus and methods for network management and more particularly to network analysis.

BACKGROUND

Computer networks are being used to provide inexpensive high-speed network connections to individuals, businesses and communities. Within corporate environments, many of the tasks performed by workers are made easier by the presence of networked computers. However, as more and more of these devices are networked together, the possibility of decreased network performance across these corporate networks increases as well.

Network analysis is sometimes used to increase network performance and determine the types of network traffic being handled. An analysis device is placed on the network and conversations between devices are analyzed with reference to a baseline performance to determine if the network is performing as expected. If the network is not performing as expected, a network engineer can look through these conversations and determine where the problems are.

Other methods include performing a snapshot network analysis, where real time trends in conversations or particular protocol traffic are looked at to see, in real-time, what is happening.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments where the example method, apparatus and system may be practiced. It is to be understood that other embodiments may be utilized, and structural changes may be made, without departing from the scope of this description.

Overview

Figure 1:
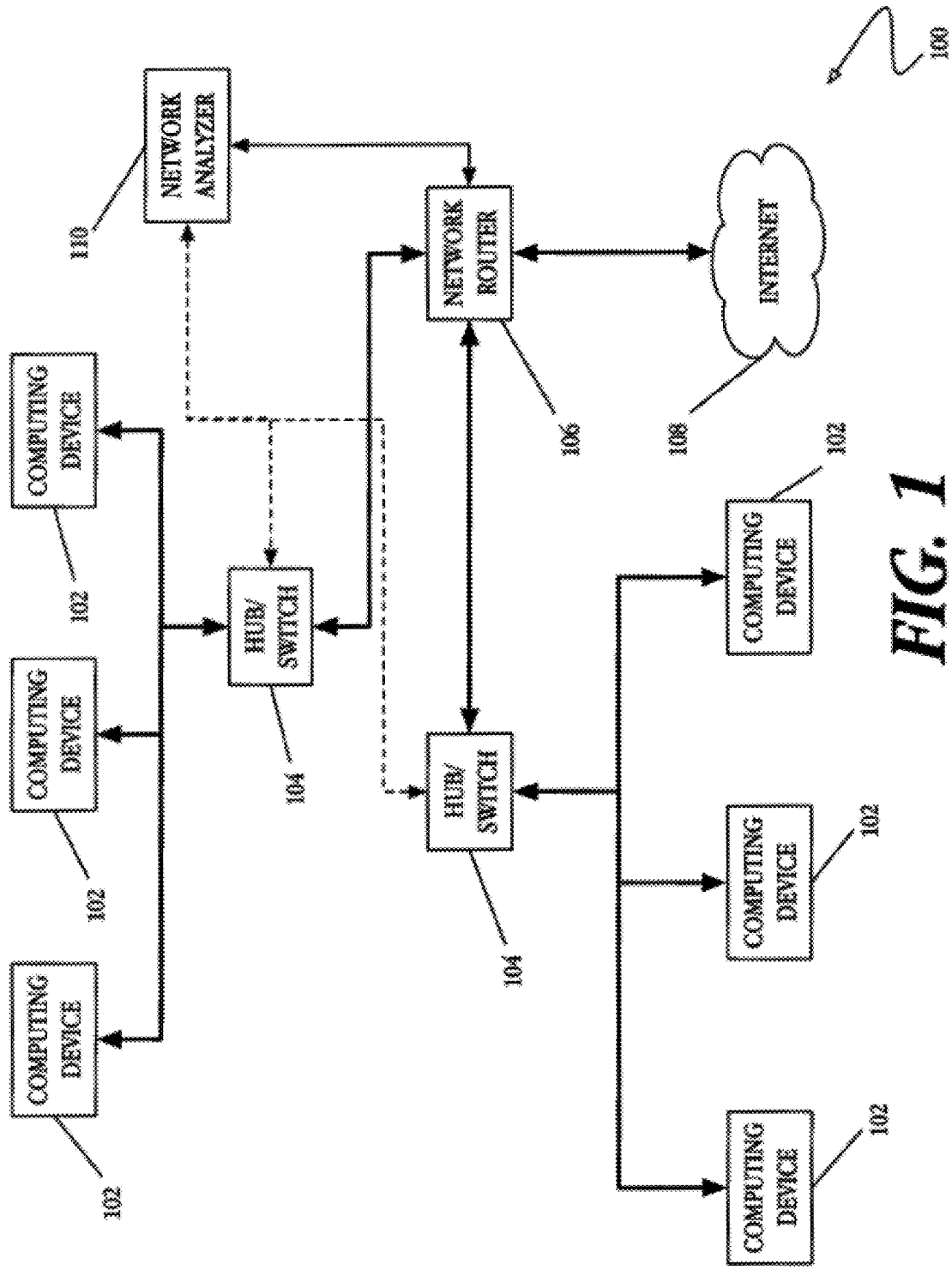
FIG. 1 shows a block diagram of a system of devices on a network, including a network analyzer on the network, according to an example embodiment.

FIG. 1 shows a block diagram of a system of devices on a network, including a network analyzer on the network, according to an example embodiment. The system 100 of networked computing devices 102 represents an example computer network. Each of the computing devices 102 is connected to a hub/switch 104. It will be understood that though the hub/switch is referred to as such, it may be either a hub or a switch, as each are configured differently. For the purposes of the present discussion, no distinction need to be made, other then to state that the hub/switch connects the computing devices 102 to a network router 106 through the hub/switch 104 and through the network router 106 to a wide area network (WAN) such as the internet 108.

In an embodiment, a network analyzer 110 is coupled to the computer network 100 to provide capture and analysis of network packets transmitted across the computer network. Each of the network transactions, or conversations between the computing devices, either within the computer network 100 or between one of the computing devices 102 and the Internet 108. Each of those conversations is comprised of a plurality of individual network data items, otherwise known as packets. The network analyzer 108 captures those packets as they are transmitted across the network and performs analysis on them. This analysis is intended to identify problems within the network, malfunctioning computing devices, malevolent users on the network, and the like. By capturing the packets and either looking at them individually, or in the aggregate, trends in network performance can be identified and problems solved. In one embodiment, the computer network 100 is implemented in Gigabit Ethernet. In a further embodiment, the computer network 100 is implemented in a network standard that transmits data faster than Gigabit Ethernet (such as 10 Gigabit Ethernet or 100 Gigabit Ethernet).

In an embodiment, the network analyzer 108 is coupled to either the hub/switch or the network router. Neither arrangement is preferred over the other, as the type of analysis required determines the arrangement used. In an alternate embodiment, the network analyzer 108 can be placed inline with one of the computing devices 108, meaning that the network connection from the hub/switch is first made to the network analyzer and then to the computing device itself. This arrangement is advantageous when only one computing device's network traffic is of interest, such as with a network server.

Systems

Figure 2:
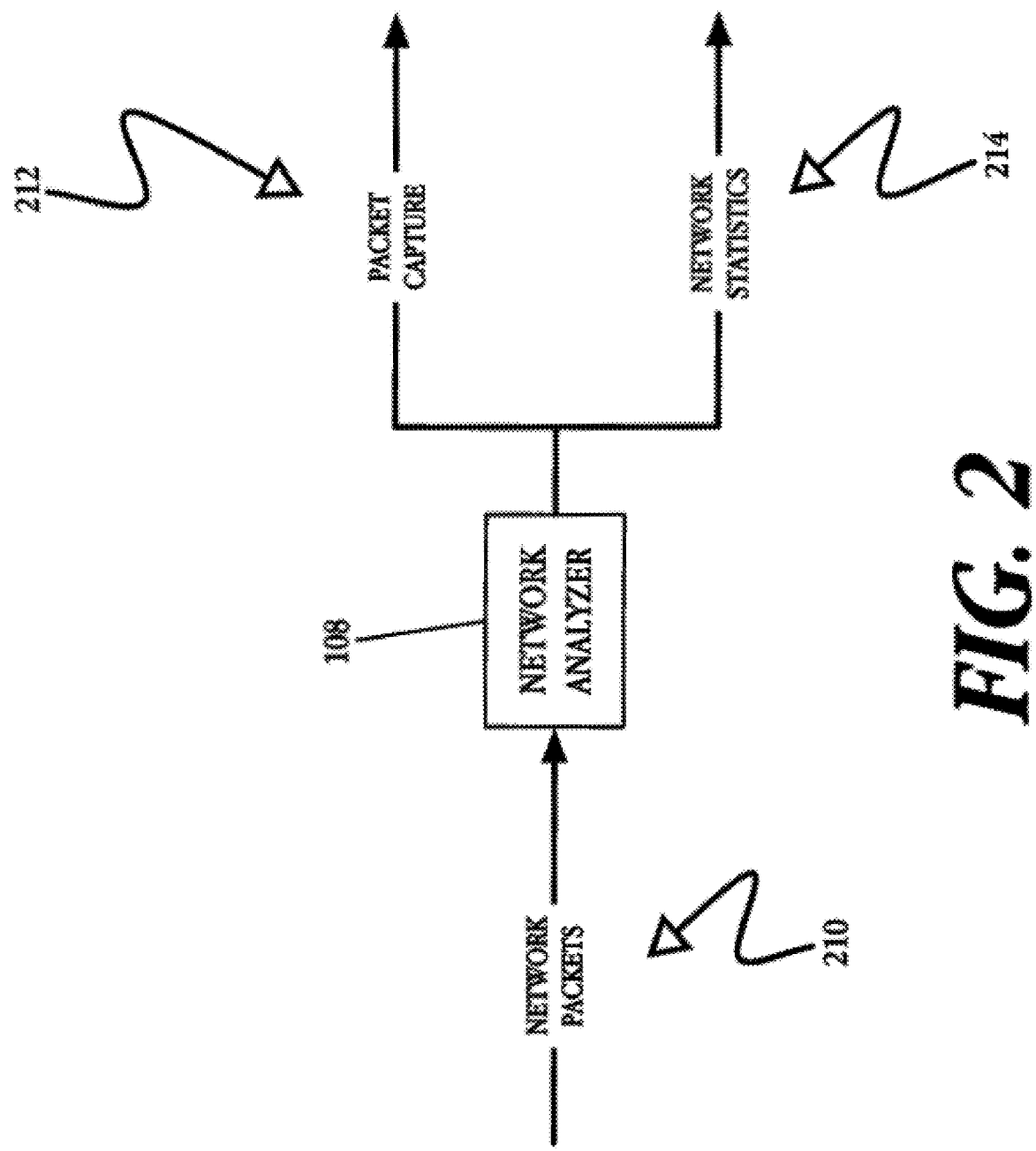
FIG. 2 shows a high level block diagram of an apparatus for analysis of network data items, according to an example embodiment.

FIG. 2 shows a high level block diagram of an apparatus for analysis of network data items, according to an example embodiment. The network analyzer 108 is configured to receive one or more network packets as an input 210 and output both a packet capture 212 and network statistics 214. The packet capture 212, in one example, includes writing each of the network packets received to a storage device. This may include a hard drive, resident memory, Fiber Channel, SCSI, SAS or RAID storage system or RAM drive. Network statistics 214 include any number of possible statistical reports regarding the network packets received.

In an embodiment, the network analyzer 108 is configured to output the packet capture 212 and the network statistics 214 concurrently. In a further embodiment, the network analyzer 108 duplicates each of the network packets 210 received and performs concurrent operations on the duplicated network packets. This arrangement provides for efficient analysis of network packets to provide network statistics without regard to the ability of the storage medium to store the captured network packets, or vice versa. In some systems, where the operations are performed serially, or by the same processing modules, the network statistics operations may cause pauses in the processing operations of the network analyzer. Any pause or disruption in the ability of the network analyzer to perform any operation may result in the dropping of one or more network packets. For instance, the network analyzer is a simple First-In-First-Out (FIFO) system. A network packet is received, and it is sent to the storage device, or captured. If the network analyzer is performing an operation at the time the network packet is received that prevents the receipt into memory, the packet is discarded. For the purposes of analysis this discarding is tolerable, as the aggregate of all network packets received provides a large enough pool of data items for statistical analysis. However, the goal of any device that performs capture operations is to capture each of the network packets received. Deeper analysis of each of the network packets can be performed at a later time in such a case, but with some packets being discarded the analysis may be flawed. The network analysis that is being performed concurrently with the capture may be simple (such as the number of packets with a particular host as the destination) or more robust (the determination as to percentages of overall traffic dedicated to one or more network protocols), but in either case it is meant to provide to the operator present information about the health and well being of the computer network under analysis. Network analysis in real-time on high speed networks is a process by its very nature in which only a portion of the entire set of network packets is analyzed.

Figure 3A:
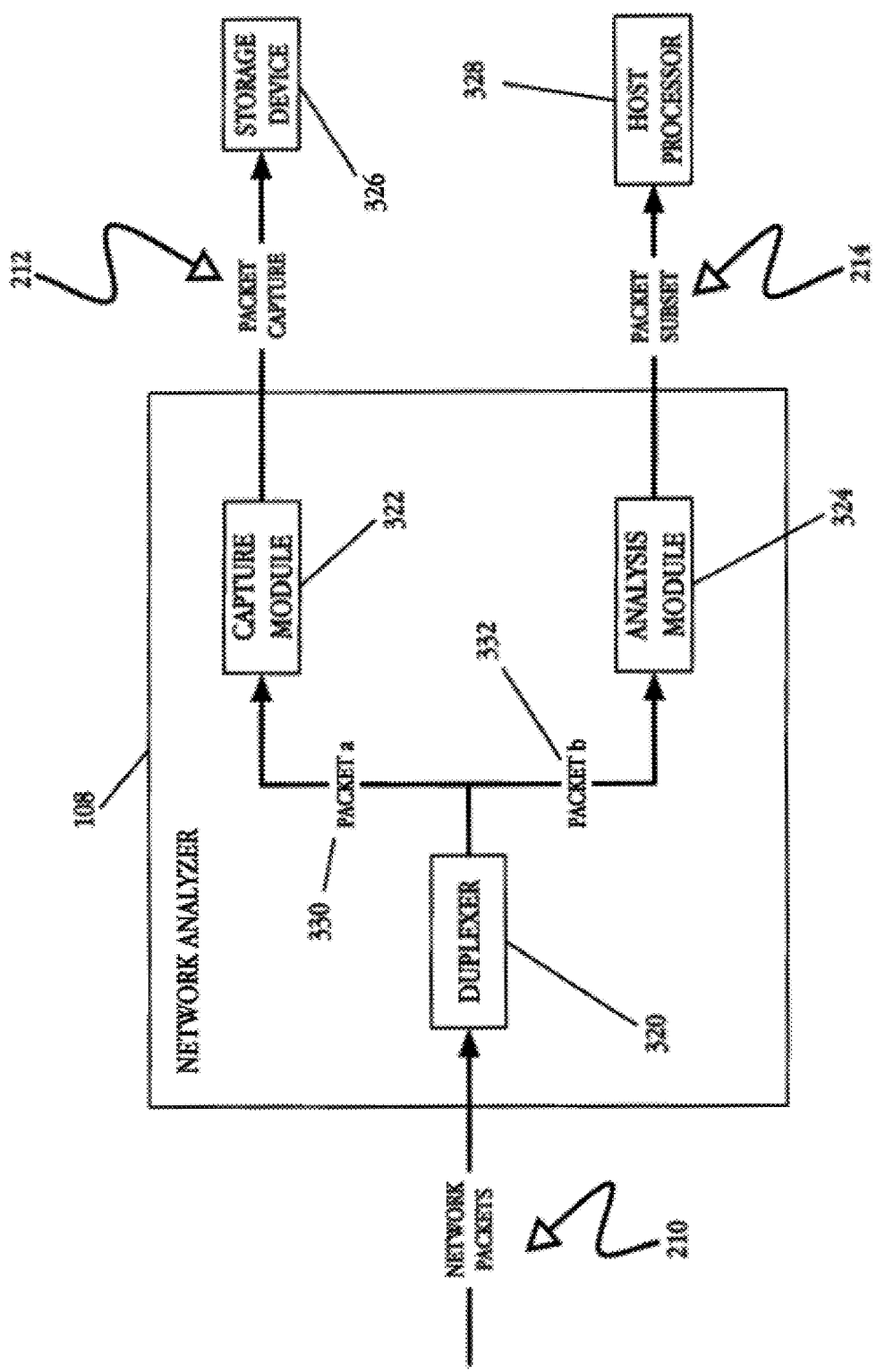
FIGS. 3A-3C show high level block diagrams of an apparatus for analysis of network data items, according to an example embodiment.

FIG. 3A shows a high level block diagram of an apparatus for analysis of network data items, according to an example embodiment. In an embodiment, the network analyzer 108 includes a receiving module which may be referred to as a duplexer 320, a capture module 322 and an analysis module 324. The capture module 322 is communicatively coupled to a storage device 326 and sends the packet capture to the storage device 326 over that link, in one example. The analysis module 324 is communicatively coupled to a host processor 328 and is configured to send instructions to the host processor 328, the instructions intended to cause the host processor 328 to execute one or more analysis functions.

In an embodiment, the duplexer 320 is configured to receive the network packets and duplicate each of them, with a first packet, packet a 330 as depicted in FIG. 3A, to the capture module 322, and a second packet, packet b 332 as depicted in FIG. 3A, to the analysis module 324. Packet a 330 and Packet b 332 are identical.

In an embodiment, the analysis module 324 is configured to receive each of the second packets from the duplexer module 320 and determine an internal state with respect to the analysis module's 324 ability to analyze the second packet. As the analysis module 324 will, in most situations, not be able to analyze each of the second network packets received from the duplexer, the analysis module 324 is configured to perform a dropping operations and will only send a packet subset 334 to the host processor 328. In one example, the packet subset 334 contains one of every x packets received, where x is either 2, 4, 8, 16, etc. If the analysis module determines that the packet subset being sent to the host processor is not being processed fast enough to clear out the network packets received from the duplexer, a step-down operation can be performed, so that if 1 out of every 2 packets where included in the packet subset, the step-down operations will increase the x value by a power of 2. In this case, the analysis module would step down to one out of every four packets. Conversely, if the host processor is performing the analysis operations faster then the packets being received by the analysis module, a step-up operations can be performed. The determination as to whether to perform a step-up or step-down operation or maintain the same ratio will be a function of a buffer coupled to the analysis module, which will be explained in greater detail below.

Figure 3B:
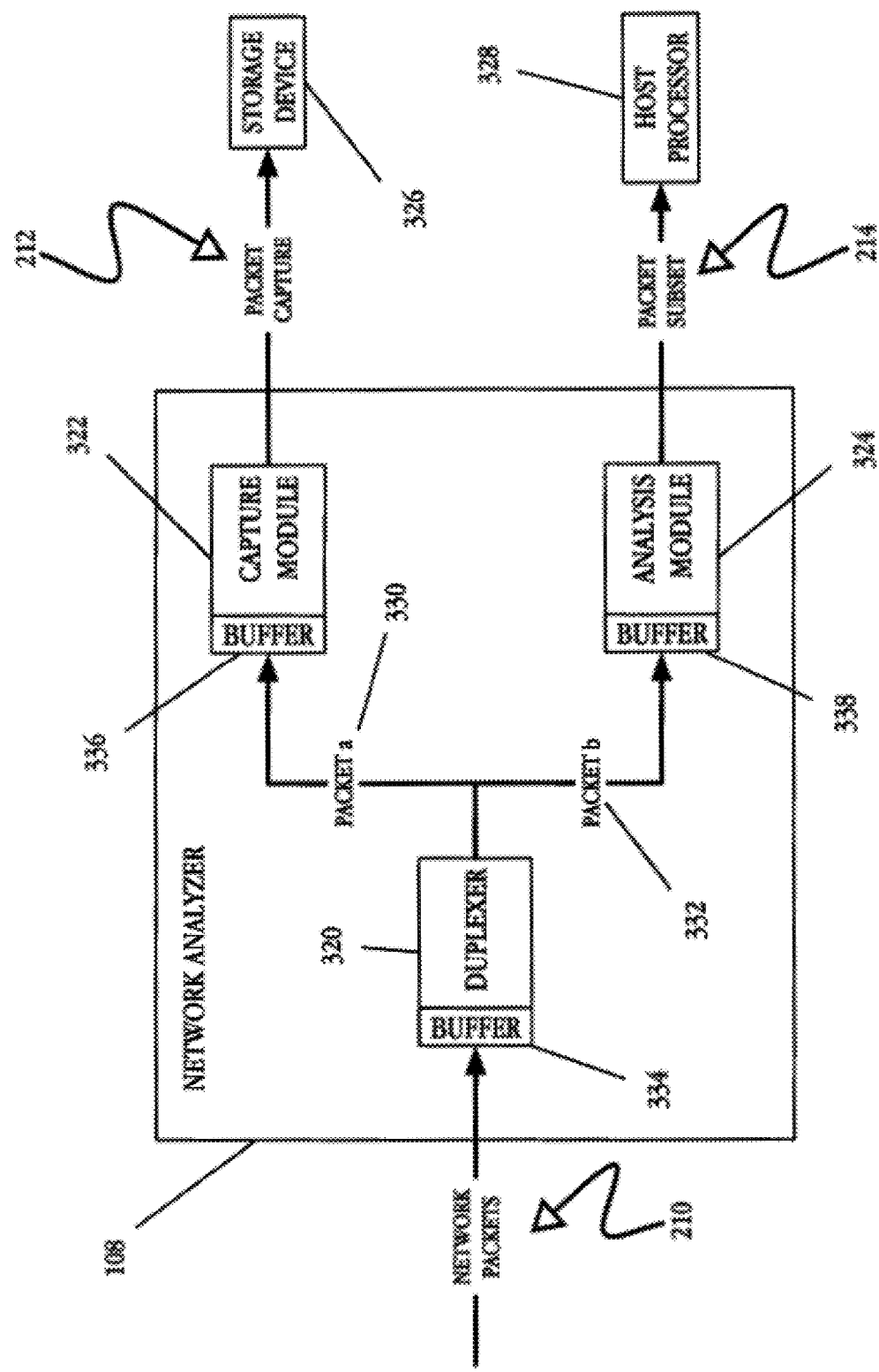

FIG. 3B shows a more detailed block diagram of the network analyzer module, according to an example embodiment. Each of the duplexer, capture module and the analysis module are coupled on the front-end to a buffer. The buffer provides to each of those modules an ability to provide temporary storage to the network packets before processing. The buffer also provides the network analyzer the ability to handle spikes in traffic, or the rate of receipt of network packets. Network packets received in the buffer coupled to the duplexer, in one example, will be processed in FIFO fashion, and in the unlikely occurrence that the buffer is full when a packet is received, that received packet will be dropped. Likewise FIFO-type buffers are coupled to the front-end of both the capture module and the analysis module.

Figure 3C:
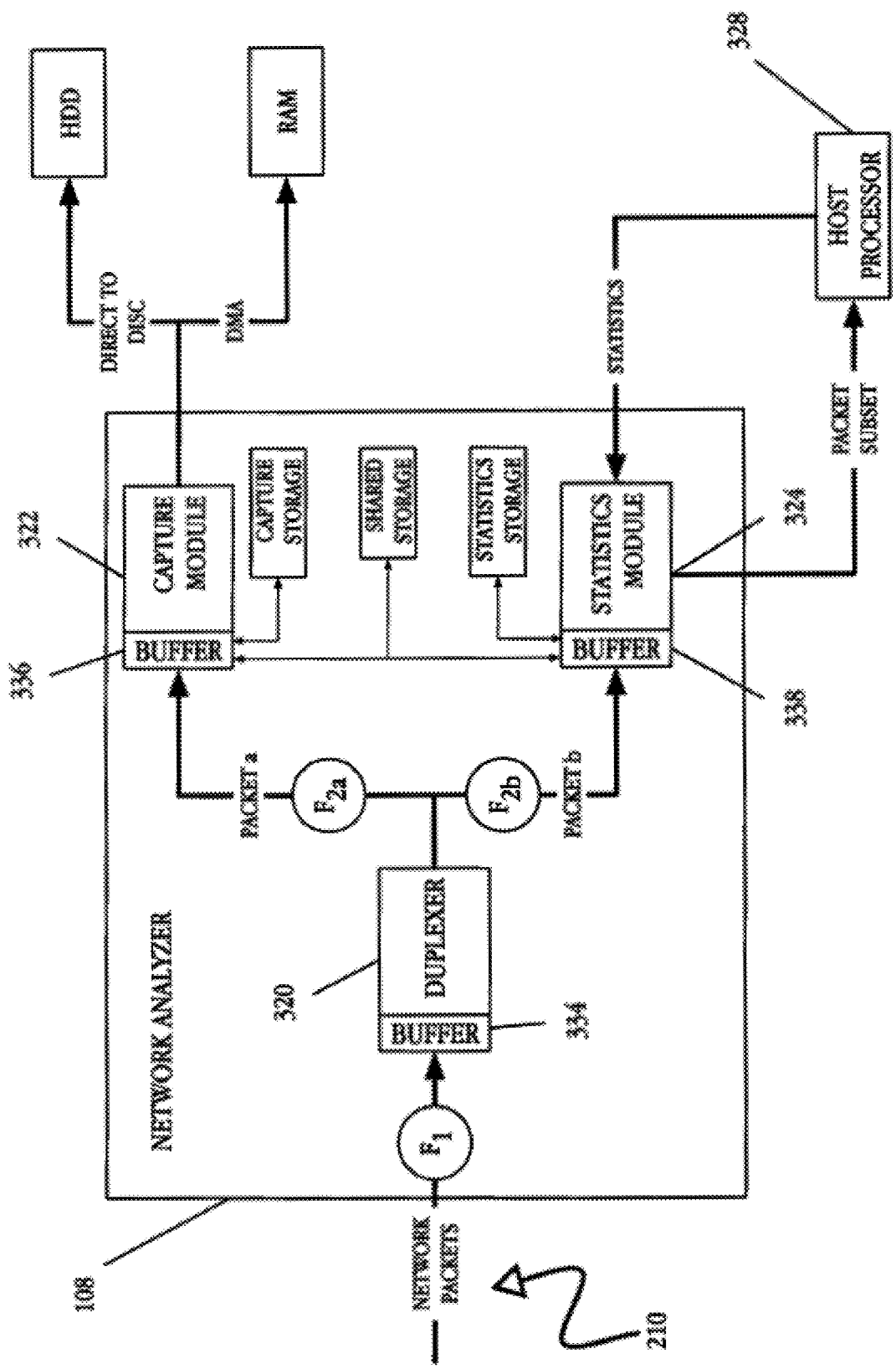

FIG. 3C shows a more detailed block diagram of the network analyzer, according to an example embodiment. The apparatus shown in FIG. 3C shows two example configurations of buffers for each of the capture and analysis module. The capture and analysis module may use a shared storage space within the network analyzer. This arrangement may reduce costs of the manufacture of the network analyzer. Alternately, each of the buffers of the capture module and the analysis module may be coupled to discrete storage, shown in FIG. 3C as capture storage and analysis storage. This arrangement is advantageous in that filling of the front-end buffer of one of the modules will not affect the buffer of the other. As discussed above, the analysis module processes network packets slower than the capture module and in turn, the buffer of the analysis module will typically be utilized to a greater extent. However, there may be times when the analysis module can not react quickly enough to changing network conditions. In such an example, the buffer may quickly fill to capacity. It is acceptable to drop packets that are directed to the analysis module, as only a general analysis of the received network packets is desired. However, as discussed above, it is not acceptable for packets to be dropped by the buffer coupled to the front end of the capture module.

In an embodiment, the analysis module in addition to being configured to send the packet subset to the host processor for operations, will received statistics from the host processor. In such an arrangement, the analysis module can react quicker to changing network conditions, or to the ability of the host processor to process more packets.

In an embodiment, the capture module is coupled to one of a variety of storage devices, either individually or in the aggregate, as depicted in FIG. 3C. The capture module, in one example, is configured to send the captured packets to random-access memory (RAM) using Direct Memory Access (DMA) such that no operations are required to be performed by the host processor, which would induce a delay in the capture, and the possible dropping of packets. In an alternate embodiment, the capture module sends the packets to a hard disk drive (HDD) using Direct to Disc, which also requires no host processor operations. The HDD drive may be any suitable drive system, including, but not limited to, a single HDD, a redundant array of inexpensive devices (RAID) array of internal hard drives, a RAID array of external hard drives, a just a bunch of disks (JBOD) array of hard drives, or any suitable drive based storage mechanism.

Figure 4:
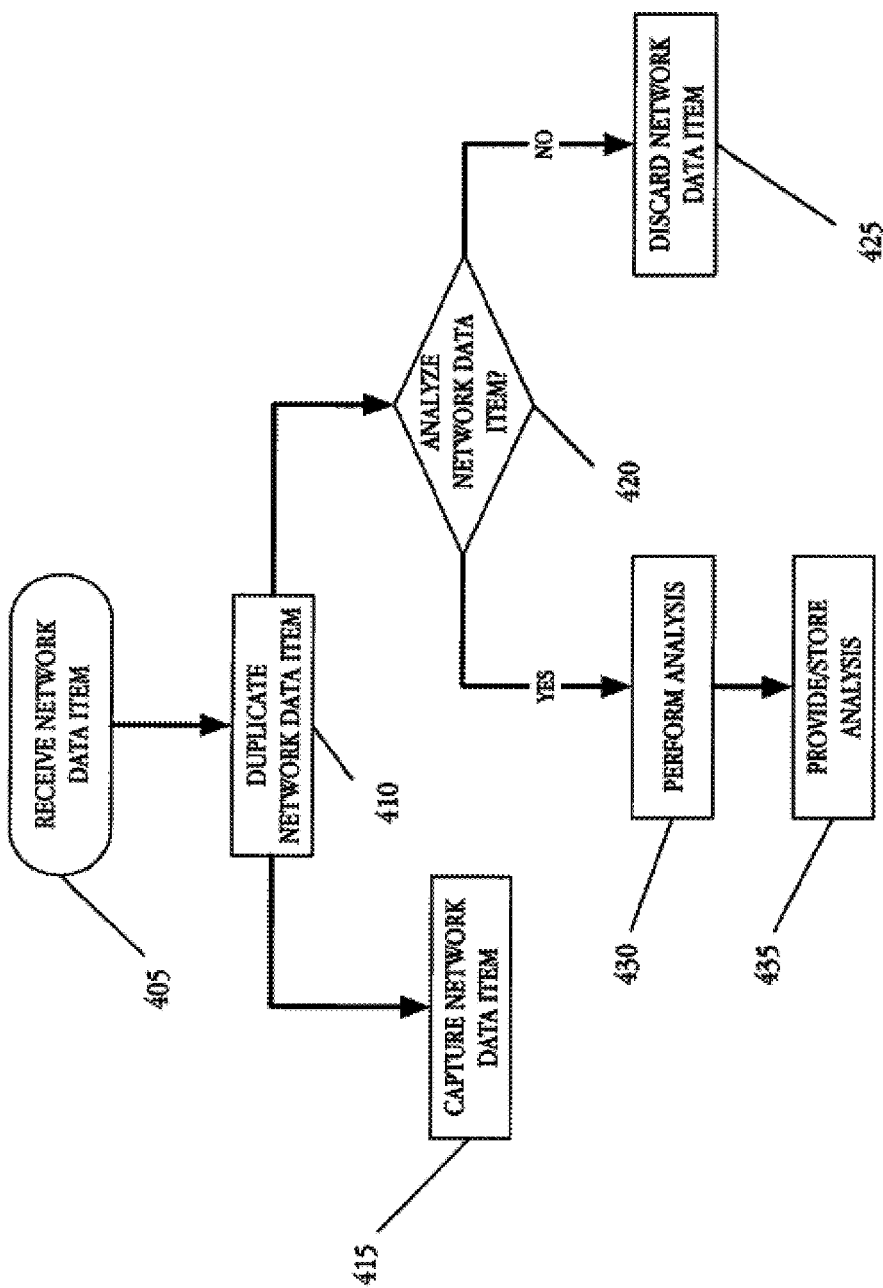
FIG. 4 shows a flowchart of a method of capturing and analyzing network data signals transmitted over a network, according to an example embodiment.

FIG. 4 shows a flowchart of a method of capturing and analyzing network data signals transmitted over a network, according to an example embodiment.

At block 405, the network analyzer receives a network data item, or network packet as depicted in the previous figures. The data item is duplicated at block 410 by the duplexer module shown above with respect to FIGS. 3A-3C. According to some embodiments the data item may be received at block 405 by receiving module. According to other embodiments, the receiving module may include the duplexer and may both receive and duplicate the data item at blocks 405 and 410. At block 415 the network data item is captured by the capture module and sent to a storage device such as those shown in FIG. 3C. Concurrent with the operation at block 415, operations on the right hand side of the figure are performed. As shown above in FIGS. 3A-3C, the capture module and the analysis module are two distinct components of the network analyzer and operations are executed concurrently for each of them such that the operations for analysis occur in parallel to those for capture.

At block 420, the analysis module determines whether to analyze that data item. If the determination is made that the data item is not to be analyzed, it is discarded, or dropped, at block 425. If the determination is made that the data item is analyzed, the data item is analyzed by operations executed on the host processor at block 430. At block 435, the analysis is provided back to the analysis module, stored on a storage device accessible to the host processor, or both. As discussed above, only one out of x network data items may be analyzed. Determining x for this will be discussed in greater detail in FIG. 5, though in a broad sense, the analysis module reads a state of the buffer coupled to the front-end of the analysis module and makes the determination based on the amount of data being stored by the buffer.

Figure 5:
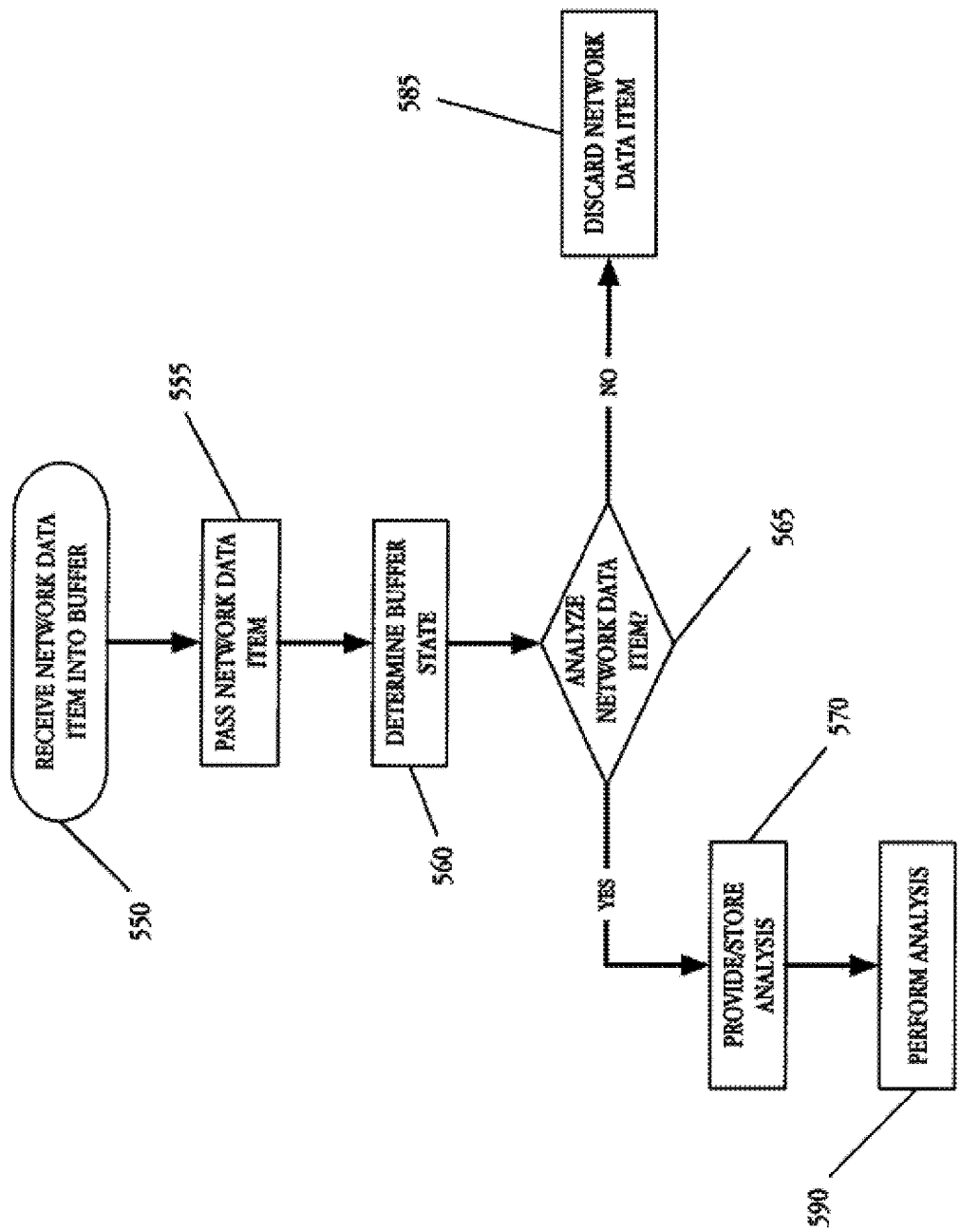
FIG. 5 shows a flowchart of a method of analyzing network data signals transmitted over a network, according to an example embodiment.

FIG. 5 shows a flowchart of a method of analyzing network data signals transmitted over a network, according to an example embodiment. The operations depicted in FIG. 5 are carried out in the analysis module depicted above with respect to FIGS. 3A-3C, and further expand on the discussion related to the determination whether to analyze or not analyze a particular data item.

At block 550, the network data item is received into the buffer coupled to the front-end of the analysis module. The buffer state is determined at block 555 by the network analyzer. The buffer has a finite storage capacity. Were the buffer to become 100% utilized, no network data items could be received into the buffer at block 550. This is the case described above where operations to actually capture a network data item to a storage device may lead to over-utilization of computing resources which in turn lead to dropped packets. In one embodiment, a percentage of the utilization of the buffer is read. In another embodiment, the percentage of the buffer utilized is read and then in turn coupled with a temporal element to determine the change in the utilization over time of the buffer. In either case, this information is read by the analysis module with respect to the ratio of packets being analyzed. As discussed above, the analysis module will only perform network analysis for the purpose of network statistics on one out of every x packets, where x may typically be 2 to some power. X is a function of the buffer percentage, or percentage utilization over time, in alternating examples. The analysis module determines if the buffer percentage exceeds some limit at block 560. If the limit is exceeded, the x value is multiplied by 2, or doubled. So, if x was 4, and the buffer percentage exceeds the limit, the new x value will be 8. This value is used, and if that particular data item is the 8th data item received, it will be analyzed at block 580. Any other data item will be discarded at block 585. This is the step-down operation discussed above.

With respect to step-up operations, if the buffer percentage falls below some value, the x value can be divided by 2, or halved. So if x was 8 and the buffer percentage fell below a value, the new x value would be 4. However, there may be more logic applied to the operation to determine the x value. At times, the buffer percentage may rise too quickly for a simple doubling operation to suffice. In such examples, a second calculation can be performed using the amount of change in the buffer percentage to determine the amount of change in the x value. For instance, if the buffer percentage was 20%, and he buffer percentage read in the next cycle was 70%, a simple step up operation may not be able to reduce the number of packets being analyzed, which will quickly fill the buffer coupled to the front end of the analysis module. Further, this may have an impact on the capture module, such as in the case where both the capture module and the analysis module share storage for each of their buffers.

Figure 6:
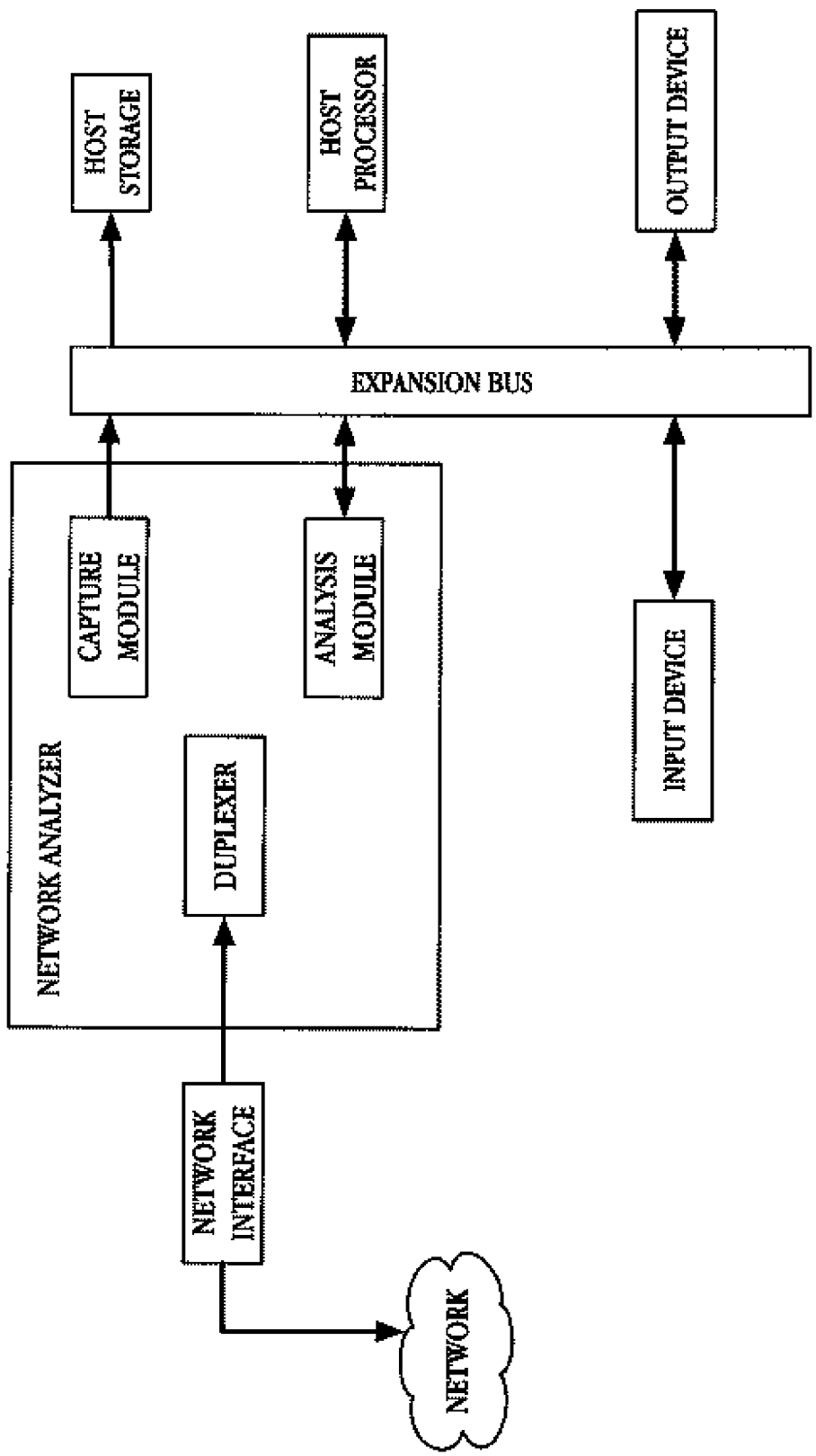
FIG. 6 shows a block diagram of a system of network analysis and capture, according to an example embodiment.

FIG. 6 shows a block diagram of a system of network analysis and capture, according to an example embodiment. In an embodiment, the network analyzer is installed as a component into a larger computing device. This may include a rack-mounted network monitoring device, or a node computing device. The system includes the network analyzer, a network interface coupled to a network, an expansion bus coupled to the network analyzer, host storage device coupled to the expansion bus, host processor coupled to the expansion bus, an input device coupled to the expansion bus, and an output device coupled to the expansion bus.

The network analyzer, in this example, receives network packets from the network interface. This network interface can be configured in any suitable manner and may be configured to provide a network connection to a high-speed network, in some examples. High speed network includes, without limitation: Gigabit Ethernet (as defined by IEEE 802.3z, more commonly referred to as 1000Base-X, where X denotes CX, SX, LX, or ZX, standardized in June 1998, and follow-on standards); 10 Gigabit Ethernet, or 10 GbE (as defined in IEEE 802.3-3005 standard); and 100 Gigabit Ethernet, or 100 GbE (as defined by the working documents of the IEEE 802.3 Higher Speed Study Group). Specific mentions of high speed networks are provide for illustrative purposes and are not intended to limit the scope of the present discussion. Embodiments of the present invention are limited only by the appended claims with respect to any one high speed network standards.

Each of the capture modules and the analysis modules are coupled to resources on the host system through an expansion bus. This expansion bus may include a peripheral component interconnect (PCI) bus, or a PCI Express (PCI-E) bus.

Figure 7:
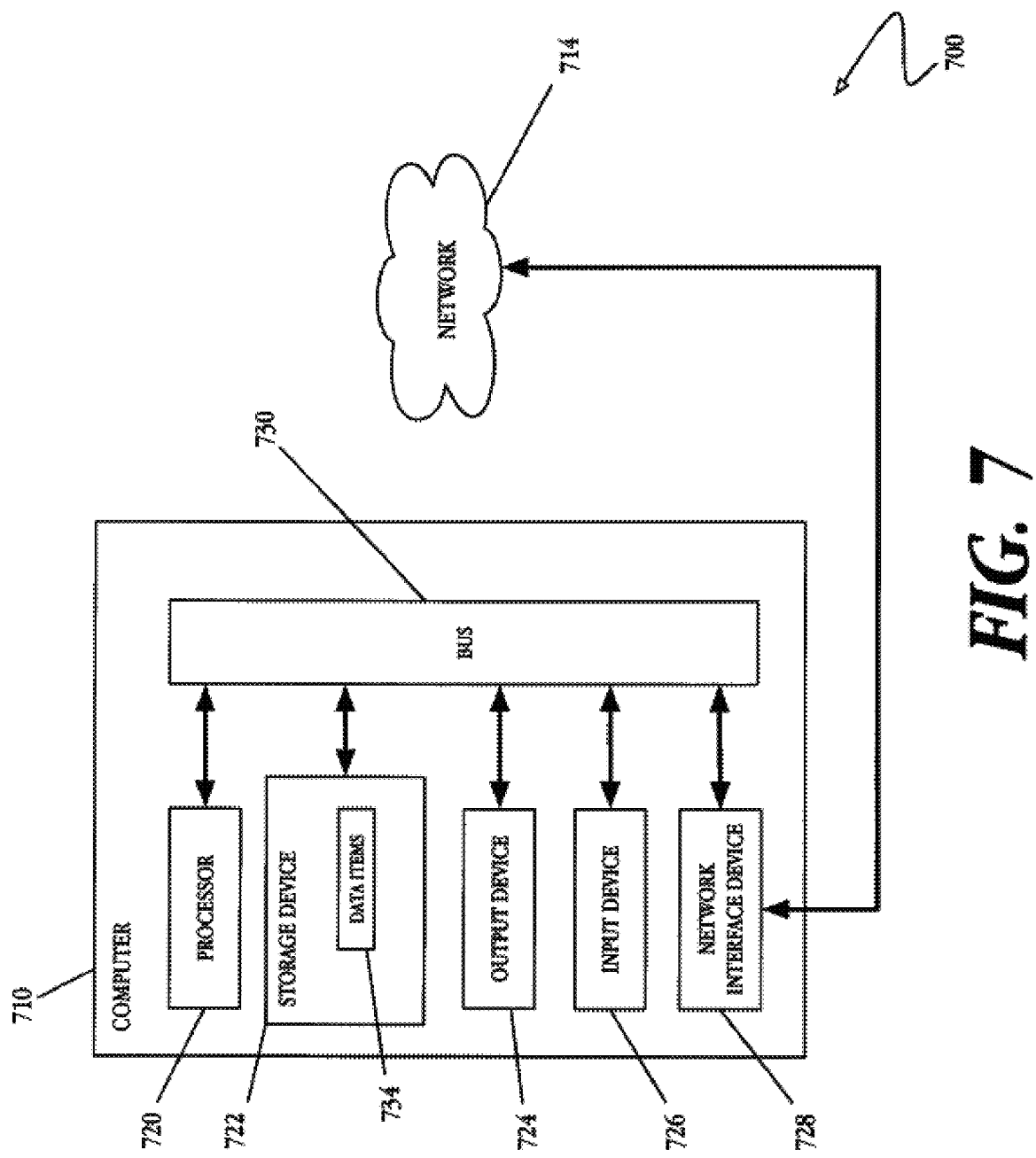
FIG. 7 shows a block diagram of a machine including instructions to perform any one or more of the methodologies described herein.

FIG. 7 block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714, reads and stores code and data in the storage device 722, and presents data to the output device 724.

Although the computer 710 is shown to contain only a single processor 720 and a single bus 730, the disclosed embodiment applies equally to computers that may have multiple processors, and to computers that may have multiple busses with some or all performing different functions in different ways.

The storage device 722 represents one or more mechanisms for storing data. For example, the storage device 722 may include read only memory (ROM), random access memory (RAM), magnetic disk storage media, optical storage media, flash memory devices, and/or other machine-readable media. In other embodiments, any appropriate type of storage device 722 may be used. Although only one storage device 722 is shown, multiple storage devices 722 and multiple types of storage devices 722 may be present. Further, although the computer 710 is drawn to contain the storage device 722, it may be distributed across other computers, for example on a server.

The storage device 722 includes a controller and data items 734. The controller includes instructions capable of being executed on the processor 720 to carry out the functions, as previously described above with reference to FIGS. 1-4. In another embodiment, the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 722 may also contain additional software and data (not shown), which is not necessary to understanding the invention.

Although the controller and the data items 734 are shown to be within the storage device 722 in the computer 710, they may be distributed across other systems, for example on a server and accessed via the network 714.

The output device 724 is that part of the computer 710 that displays output to the user. SEQ CHAPTER \h \r 1 The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather then a restrictive sense.

What is claimed is:

1. An apparatus comprising a non-transitory machine readable storage medium including instructions that, when executed by a network analysis expansion card coupled to a host device over a PCI-Express bus, cause the network analysis expansion card to:
   receive a network data item from a network and duplicate the network data item into a first network data item and a second network data item;
   store, using a capture module, the first network data item on a storage device;
   buffer, in an input buffer coupled to a statistics module on the network analysis expansion card, the second network data item;
   repeat the receive, duplicate, store, and buffer steps so that the input buffer contains a plurality of second network data items;

select from the input buffer, by the statistics module, one out of every X second network data items of the plurality of second network data items to form a subset of the plurality of second network data items, wherein the X is greater than one and is determined based on a utilization percentage of the input buffer and a rate of change in utilization percentage of the input buffer; and perform, on the host device, network analysis on the subset of the plurality of second network data items, wherein a result of the network analysis is sent back to the statistics module over the PCI-Express bus.

2. The apparatus of claim 1, wherein the storage device is random-access memory (RAM), and the capture module uses Direct Memory Access (DMA).

3. The apparatus of claim 1, wherein the storage device is a hard disk drive (HDD), and the capture module stores the first network data item to the hard disk drive (HDD) using Direct-to-Disk.

4. The apparatus of claim 1, wherein the capture module requires no operations to be performed by a host processor in support of capturing the first network data item.

5. The apparatus of claim 1, wherein the statistics module sends instructions to a host processor to perform network analysis on the subset of the plurality of second network data items.

6. The apparatus of claim 5, wherein the instructions are sent over a PCI Express bus.

7. The apparatus of claim 5, wherein the statistics module receives statistics from the host processor based on the network analysis.

8. A method comprising:
receiving, on a network analysis expansion card coupled to a host device over a PCI-Express bus, a network data item from a network;
duplicating, on the network analysis expansion card, the network data item into a first network data item and a second network data item;
storing the first network data item on a storage device;
buffering, in an input buffer coupled to a statistics module on the network analysis expansion card, the second network data item;
repeating the receiving, duplicating, storing, and buffering steps so that the input buffer contains a plurality of second network data items;
selecting, by the statistics module, one out of every X second network data items of the plurality of second network data items from the input buffer to form a subset of the plurality of second network data items, wherein the X is greater than one and is determined based on a utilization percentage of the input buffer and a rate of change in utilization percentage of the input buffer; and analyzing the subset of the plurality of second network data items using the host device, wherein a result of the analyzing is sent back to the statistics module over the PCI-Express bus.

9. The method of claim 8, further comprising pre-filtering the network data item before duplicating the network data item.

10. The method of claim 8, further comprising pre-filtering the network data item based on one or more of the following: source node, network or transmission protocol, or network traffic interest.

11. The method of claim 8, wherein storing the first network data item on a storage device is performed using Direct Memory Access (DMA).

12. A system comprising:
a processor contained within a host device;
a network analysis expansion card coupled to the host device over a PCI-Express bus, the network analysis expansion card comprising:
a receiving module receiving a network data item from a network and duplicating the network data item into a first network data item and a second network data item;
a capture module receiving, from the receiving module, the first network data item and storing the first network data item on a storage device;
an input buffer buffering the second network data item received from the receiving module, in parallel with the capture module receiving the first network data item, wherein the receiving and duplicating by the receiving module, the receiving by the capture module, and the buffering by the input buffer are repeated so that the input buffer contains a plurality of second network data items; and
a statistics module selecting, from the input buffer, one out of every X second network data items of the plurality of second network data items to form a subset of the plurality of second network data items, sending the subset of the plurality of second network data items to the host device to perform network analysis on the subset of the plurality of second network data items, and receiving a result of the network analysis from the host device over the PCI-Express bus, wherein the X is greater than one and is determined based on a utilization percentage of the input buffer and a rate of change in utilization percentage of the input buffer.

13. The system of claim 12, further comprising a storage device, the storage device including at least one of the following arrays of hard disk drives coupled to the system: a redundant array of inexpensive devices (RAID) or just a bunch of disks (JBOD) array.

* * * * *